May 26, 1931.  V. G. APPLE  1,806,579
BRAKE MECHANISM
Filed Jan. 11, 1929  2 Sheets-Sheet 1
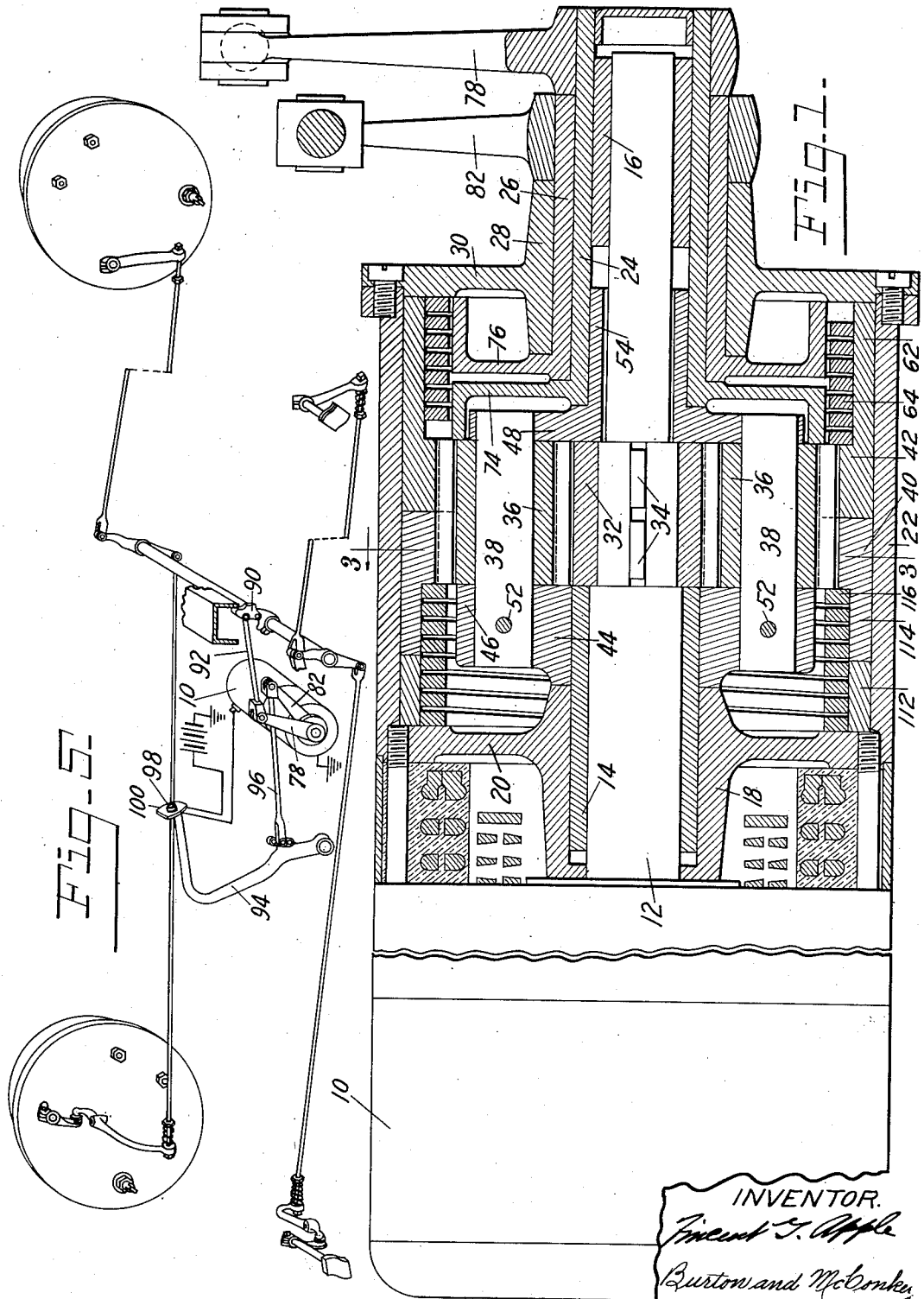

May 26, 1931.  V. G. APPLE  1,806,579
BRAKE MECHANISM
Filed Jan. 11, 1929    2 Sheets-Sheet 2
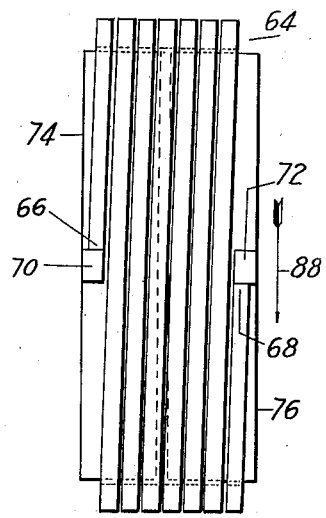
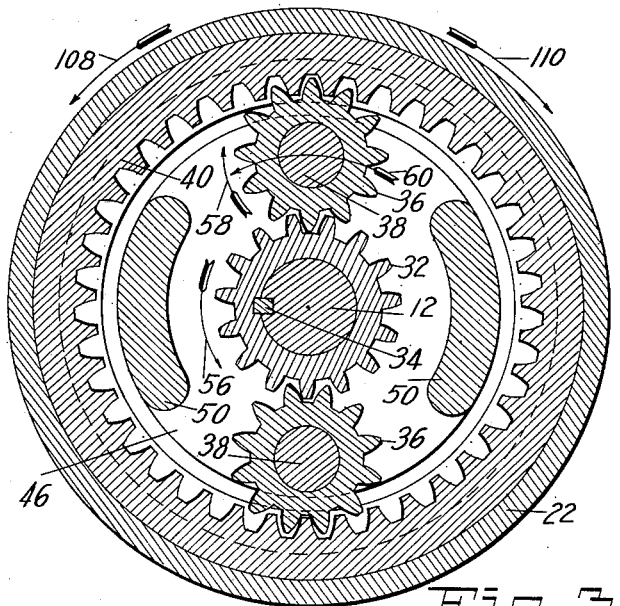
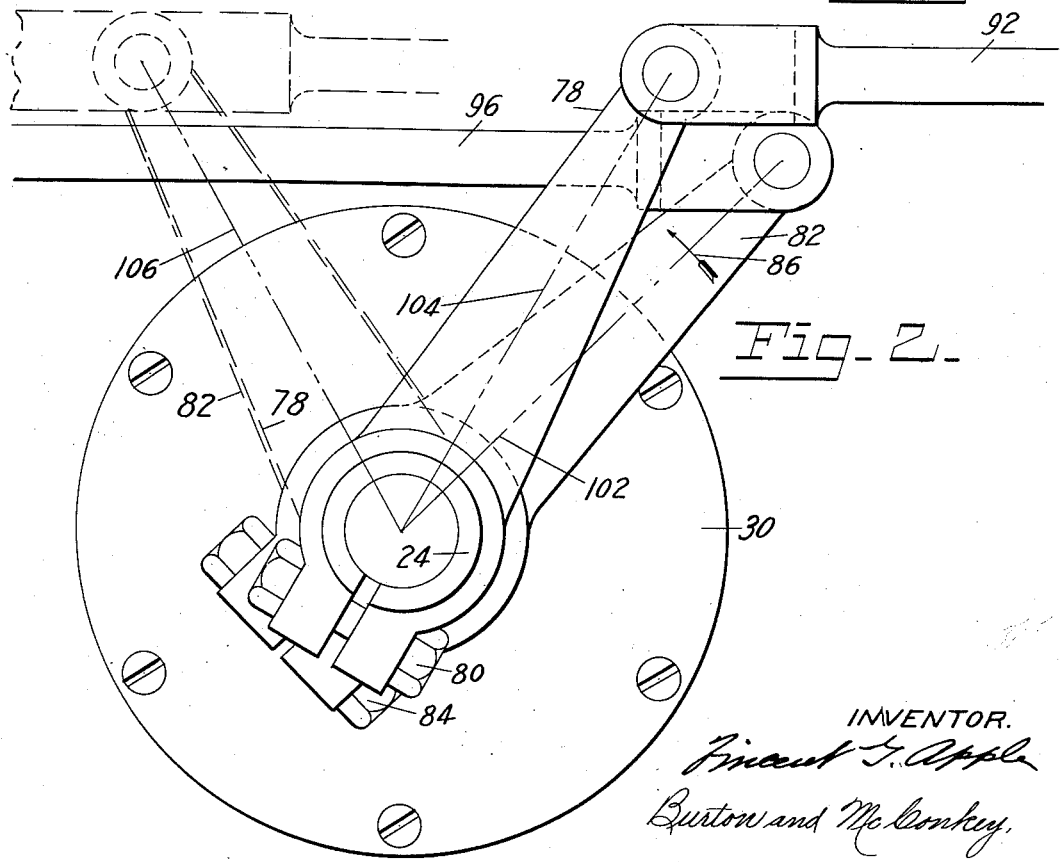
INVENTOR.
Vincent G. Apple
Burton and McConkey,
ATTORNEYS.

Patented May 26, 1931

1,806,579

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

BRAKE MECHANISM

Application filed January 11, 1929. Serial No. 331,789.

My invention relates to improvements in brake mechanism and particularly to brakes as applied to a motor driven vehicle and is illustrated as embodied in brake mechanism wherein power is taken from an electric motor to apply the brakes, and wherein manual power may act in conjunction with the electric power, and in a predetermined ratio.

One object of the invention is to include, with the motor, mechanism having gearing capable of transmitting power at a suitable rate from the relatively high speed shaft of the motor to a slow moving member, together with means operable to connect and disconnect the brakes with said slow moving member to be actuated thereby.

Another object is to so construct the mechanism which transmits the motor power to the slow moving member that this member may be manually independently actuated without operating the motor.

Another object is to so associate the electric control mechanism with the hand or pedal brake operating means whereby the motor is operative only when said means is being manually actuated by the operator to apply the brakes.

Further and other meritorious advantages reside in providing improved clutch mechanism cooperating with the electric motor to couple the same with the brakes to apply a power impulse thereto and operable in part to transmit a mechanical impulse directly from the brake operating member to the brakes; combined electrically driven and manually operated connections to apply the brakes including control mechanism for the electric servo responsive to the initial engagement of the brake operating member by the driver, and control mechanism to couple the brakes with the servo and with the brake operating member responsive to the initial brake applying movement of the brake operating member; yielding means in the connections between the operating member and the brakes adapted to control the clutch and bring the servo into play to apply the brakes; and lost motion connections between the operating member and the brakes, normally disconnecting the same and disconnecting the servo, operable to make both connections effective upon initial brake applying movement of the operating member.

The above objects and others, together with various desirable features and advantages of my invention will more fully appear from the following specification, appended claims and accompanying drawings, wherein:

Fig. 1 is an elevation of the motor with its gear-mechanism shown in longitudinal axial section.

Fig. 2 is a right hand end view of Fig. 1.

Fig. 3 is a transverse section taken at 3—3 of Fig. 1.

Fig. 4 is a detail view of the clutch.

Fig. 5 is a perspective view showing a braking system embodying the principles of my invention.

Similar numerals refer to similar parts throughout the several views.

In the embodiment of my invention herein selected for illustration the motor 10 is of the low voltage bar wound type adapted to receive its current from a storage battery. Its armature, not shown, is supported in overhung fashion on one end of shaft 12, which has one bearing bushing 14 adjacent the armature and the other bearing bushing 16 at the outer end. Since there is no bearing at the commutator end, trouble from oil getting on the commutator and brushes is entirely eliminated.

Bearing bushing 14 is supported in hub 18 formed in end wall 20 of gear housing 22, while bearing bushing 16 is held in sleeve 24 rotatable in another sleeve 26 which is in turn rotatably supported in hub 28 of gearing housing cover 30.

The reduction gearing is of the planetary type and comprises the driving pinion 32 secured to shaft 12 by keys 34, two planet pinions 36 free to rotate on studs 38 and to revolve about pinion 32 and two internal ring gears 40 and 42 which have their rotative bearing in housing 22. Ring gear 42 has two more teeth than ring gear 40 but is of the same diameter.

The planet-pinion carrier 44 comprises a relatively heavy end plate 46 and a somewhat thinner end plate 48 tied together by integral arms 50 (see Fig. 3). Studs 38 are supported in end plates 46 and 48 and are secured against rotation and axial movement therein by pins 52.

Carrier 44 at the one end is bored to fit over and revolve freely on an extending end of bushing 14, while at the other end it has a hub 54 which is turned to fit into and revolve in sleeve 24. Hub 54 surrounds but clears the high speed shaft 12.

With the gearing proportioned and arranged as shown a great speed reduction is provided. For if ring gear 40 is held against rotation and pinion 32 is revolved in the direction of arrow 56 (see Fig. 3), the planet pinion rotates in the direction of the arrow 58, but revolves in the direction of the arrow 60 five eighteenths revolutions to one turn of pinion 32, and since ring gear 42 has two more teeth than ring gear 40 this advances ring gear 42, in the direction of arrow 60, five three hundred sixty ninths of a revolution, that is to say it takes nearly seventy four turns of the motor to turn ring gear 42 once about its axis.

Having provided a slow moving member to which the brake operating rods may be coupled to power operate the brakes it remains to provide mechanism which so couples them whenever a driver attempts to apply the brakes by his own effort and which uncouples them whenever said effort is discontinued.

The slow moving ring gear 42 has extending as an integral part thereof a cylinder 62 hardened and accurately ground at its internal diameter. A spring 64 of rectangular wire is accurately ground at its outer diameter to fit into cylinder 62 freely. The ends 66 and 68 of the wire composing the spring are cut off squarely (see Fig. 4) and rest against lugs 70 and 72 which extend upwardly from flange members 74 and 76 respectively. Flange members 74 and 76 are integral parts of sleeves 24 and 26 respectively. Brake rod arm 78 is secured to sleeve 24 by bolt 80 and pedal rod arm 82 is secured to sleeve 26 by a similar bolt 84 (see Fig. 2).

From a consideration of Figs. 1, 2 and 4 it will be apparent that if pedal rod arm 82 is moved in the direction of arrow 86 Fig. 2, without moving brake rod arm 78 proportionately, the lug 72 Fig. 4 will be shifted, relative to the lug 70, in the direction of the arrow 88, the pressure against the end 68 of spring 64 enlarging the diameter of the spring to cause it to fit cylinder 62 Fig. 1 more snugly, so that the spring 64, the flanges 74 and 76, the sleeves 24 and 26 and the arms 78 and 82 are all revolved simultaneously in the direction of the arrow 86 Fig. 2 as long as lug 72 is kept in advance of lug 70.

Brake rod arm 78 is coupled to the brake shaft arm 90 Fig. 5 by brake rod 92 and pedal rod arm 82 is coupled to pedal 94 by pedal rod 96. Pedal 94 carries a switch 98 adapted to operate and supply current to motor 10 whenever pressure is applied to tread 100 of pedal 94.

When the brake mechanism is inoperative pedal rod arm 82 is centered on the line 102 and brake rod arm 78 is centered on the line 104 (see Fig. 2). But when the pedal 94 is depressed sufficiently to move arm 82 until its center line 102 coincides with line 104, then spring clutch 64 is fully expanded into cylinder 62 and both arms are carried in the direction of arrow 86 as long as the operator keeps arm 82 in line with arm 78. This he may do if he so desires until both arms reach about the line 106 at which point the wheels will lock, but as soon as he relieves the pedal pressure sufficiently to permit arm 82 to lag behind arm 78 the spring clutch 64 is less expanded and the motor revolves without moving brake rod arm 78.

Now if it were not for the possibility that the electric current would at some time fail, no further mechanism would be required, but since the current may at some time fail, manual means to operate the system must be provided, and since there is no means whereby pedal rod arm 82 may operate brake rod arm 78 without first expanding and engaging clutch 62 it follows that in order to operate the brakes by pedal effort alone the cylinder 62 must be revolved by the pedal movement. But planetary trains of this type do not reverse, and cylinder 62 may not be revolved except by the motor, unless special mechanism is provided to permit it.

In the planetary gear train shown, the ring gear 42 is driven in the direction of arrow 108 by holding the ring gear 40 against rotating in the direction of the arrow 110 (see Fig. 3). A cylinder 112 secured to housing 22 by a means not shown, and a cylinder 114 which is an integral part of ring gear 40 together receive a spring 116 which is a duplicate of spring 64 except that it is wound the opposite hand and that it fits its cylinders more snugly in its normal inoperative state.

The cylinders 112 and 114 and the spring 116 operate together as a spring ratchet in the well known manner to prevent rotation of ring gear 40 in the direction of arrow 110 but to permit it in the direction of the arrow 108, so that as long as the motor 10 is supplying power to apply the brakes the ratchet holds ring gear 40 against backward rotation but when no power from motor 10 is available the entire gear mechanism including the motor armature may be moved bodily in unison with sleeves 24 and 26 when the brakes must be applied by pedal pressure alone.

I claim:

1. Brake mechanism comprising, brakes, a brake operating member, a motor, a clutch driven thereby, connections between the operating member and clutch, clutch-to-brake connections, and means including said connections whereby pedal effort is transmitted to the brakes.

2. Brake mechanism comprising, brakes, a brake pedal, a motor, a clutch driven thereby, pedal-to-clutch connections, clutch-to-brake connections, and means whereby said pedal-to-clutch connections operate through said clutch-to-brake connections upon engagement of the clutch to operate the brakes.

3. Brake mechanism comprising, brakes, a brake pedal, a motor, a clutch driven by the motor, mechanical connections from the pedal to the brakes having lost motion to be overcome before becoming mechanically effective to apply the brakes, said lost motion being effective to engage said clutch to transmit brake applying force from the motor.

4. Brake mechanism comprising, brakes, a brake operating member, a motor, a motor driven brake operating clutch, mechanical connections from the pedal to the brakes including the clutch and means adapted to yield and thereby engage the clutch whereby power and manual effort act together to apply the brakes.

5. Brake mechanism comprising, brakes, a brake operating member, a motor, brake operating connections between the motor and the brakes including a clutch operable when engaged to deliver power from the motor to apply the brakes, means responsive to the movement of the brake operating member controlling said clutch and operable to act through the clutch to apply the brakes independently of the motor.

6. Servo braking mechanism comprising, in combination, brakes, a brake pedal, a motor, a motor driven brake operating clutch, an arm operable by said pedal, another arm adapted to operate said brakes, yielding means connecting the two said arms whereby the first may operate the second, said yielding means being adapted also to engage said clutch whereby the pedal and the motor may act together to apply said brakes.

7. Servo braking mechanism comprising, in combination, brakes, a brake pedal, a motor, a motor driven brake operating clutch, pedal-to-clutch connections, clutch-to-brake connections, means joining the two aforesaid connections whereby the first may operate the second, said means being operable also to engage said clutch to deliver power from the motor to the brakes.

8. Brake mechanism comprising, in combination, brakes, a brake pedal, a motor connected with a source of power supply through control means carried by the brake pedal and responsive to the initial engagement thereof by an operator to connect the motor with the source of power supply, and means operable to couple the brakes with the motor to be power actuated thereby upon the initial movement of the pedal by the operator to apply the brakes.

9. Brake mechanism comprising, in combination, brakes, a brake pedal, a motor connected with a source of power supply through control means carried by the brake pedal and responsive to the initial engagement thereof by an operator to connect the motor with the source of power supply, mechanical connections coupling the motor with the brakes to apply the brakes operable only upon brake applying movement of the pedal and capable of transmitting either a power impulse from the motor or a mechanical impulse from the pedal to apply the brakes.

10. Servo braking mechanism comprising, in combination, brakes, a brake pedal, a motor, a motor driven brake operating member, an arm operable by said brake pedal, a second arm adapted to operate said brakes, yielding means connecting said arms, and means operable by the first arm to frictionally couple the second arm to said motor driven member and to convert said yielding means into a positive means by said frictional engagement.

11. Servo braking mechanism comprising, in combination, brakes, a brake pedal, a motor, a motor driven brake operating member, an arm operable by said brake pedal, a second arm adapted to operate said brakes, yielding means connecting the two said arms, said yielding means being adapted to be overcome by action of the pedal on the first arm and brought into frictional engagement with said motor driven member proportional to the pedal applied effort.

12. Servo braking mechanism comprising, in combination, brakes, a brake pedal, a motor, a motor dirven brake operating clutch, mechanical connections from said pedal to said brakes, lost motion means in said connections, means to oppose said lost motion, said opposing means being adapted to be overcome to frictionally engage said clutch.

13. Servo brake mechanism, comprising, in combination, brakes, a manual brake operating member, a motor having a rotatably driven shaft, mechanical means coupling the manual brake operating member with the brakes to apply the brakes including clutch mechanism associated with the motor shaft comprising two coil springs encircling the shaft and cooperating to couple the shaft with the brakes to exert brake applying force thereon, one of said springs adapted to transmit driving torque from the shaft to apply the brakes and adapted to transmit driving torque from the brake operating member to the brakes to apply the brakes when the motor is idle.

14. Servo braking mechanism comprising, in combination, brakes, a brake pedal, a motor, an annular rotatable member driven by said motor, mechanical brake operating connections from said pedal to said brakes, and a coil spring so interposed in said connections that pedal effort to apply the brakes urges the spring into frictional engagement with said annular rotatable member to power assist said pedal effort.

15. Servo braking mechanism, comprising, in combination, brakes, a brake pedal, a motor, speed reducing mechanism driven by said motor including a relatively slow moving cylinder, a coil spring adapted to fit said cylinder freely, connections from one end of said spring to said pedal and connections from the other end of said spring to said brakes, whereby the diameter of said spring is altered to fit said cylinder tightly thereby to apply power effort to said connections to assist said pedal effort whenever pedal effort is applied.

16. Servo braking mechanism comprising, in combination, brakes, a brake pedal, a motor, speed reducing mechanism driven by said motor including a relatively slow moving hollow cylinder, a relatively heavy coil spring supported to fit freely within said cylinder, connections from one end of said spring to said pedal, and connections from the other end of said spring to said brakes, whereby upon pedal movement the ends of said spring are actuated to increase the diameter of said spring to fit snugly within said cylinder thereby to apply power effort to said connections to assist said pedal effort whenever pedal effort is applied.

17. Servo braking mechanism comprising, in combination, brakes, a brake pedal, a motor, speed reducing gear mechanism driven by said motor including a relatively slow moving hollow cylinder, a relatively heavy coil spring supported to fit freely within said cylinder, a rotatable member having a flange carrying a lug engaging one end of said spring and carrying a pedal operated arm, a second rotatable member having a flange carrying a lug engaging the other end of said spring and carrying a brake operating arm, means connecting the pedal to said pedal operated arm and means connecting the brakes to said brake operating arm.

18. Servo braking mechanism comprising, in combination, brakes, a brake pedal, a motor having a rotatable shaft, planetary gearing surrounding said shaft including a relatively slow moving gear driving a hollow cylinder, a relatively heavy coil spring within said cylinder, flanged tubular members surrounding the motor shaft one within the other each carrying an outwardly extending lug one to engage each end of said spring, a pedal operated arm on one tubular member, a brake operating arm on the other tubular member, means connecting said pedal to said pedal operable arm and means connecting said brakes to said brake operating arm.

19. Servo brake mechanism comprising, in combination, brakes, a manual brake operating member, a motor having a rotatably driven shaft, planetary gearing including two relatively rotatable ring gears encircling said shaft and coupled therewith by planetary gears, means operable to hold one of said ring gears against rotation in a given direction whereby the other ring gear is driven from the shaft by the planetary gears, means including said gearing coupling the manual brake operating member with the brakes operable to couple the driven ring gear with the brakes to exert a power impulse of brake application thereon.

20. Clutch mechanism comprising, in combination, a revolvable cylinder, a relatively heavy coil spring normally free to revolve within and independently of said cylinder, two members rotatable independently of said cylinder and carrying means to engage the ends of said spring to enlarge its diameter when said members are oppositely rotated, and means to oppositely rotate said members, whereby said spring is forced into frictional contact with said cylinder thereby tending to revolve with said cylinder only as long and in such degree as said members are maintained in said oppositely rotated relation.

21. Brake mechanism including, in combination, brakes, a source of power, a brake pedal, means operable on initial depression of said pedal for frictionally coupling said brakes with said power source to apply the same, said means being operable upon further depression of said pedal to increase the power of said frictional coupling.

22. Brake mechanism including, in combination, brakes, a rotatable power source, a brake pedal, means for energizing said power source on initial depression of said pedal, and means for drawing power from said source and transmitting the same to said brakes in direct proportion to the pressure exerted upon said pedal.

23. Brake mechanism including, in combination, brakes, a rotatable power source, a brake pedal, means for energizing said power source on initial depression of said pedal, means for drawing power from said source and transmitting the same to said brakes in direct proportion to the pressure exerted upon said pedal, and means associated with said rotatable power source whereby the manual pressure exerted upon the pedal may be directly applied to the brakes through said transmitting means independently of said power source upon failure thereof.

24. In combination with a brake actuating shaft and a brake pedal, an electric motor, a rotatable drum including an internal ring gear, planetary gearing connecting said motor and ring gear, and means for transmitting power from the rotation of said drum to actuate the brake shaft.

25. In combination with a brake actuating shaft and a brake pedal, an electric motor, a rotatable drum including an internal ring gear, planetary gearing connecting said motor and ring gear, and means for transmitting power from the rotation of said drum to actuate the brake shaft, said means being controlled by depression of said pedal.

26. In combination with a brake shaft, a brake pedal and an electric motor, means for closing a circuit through the motor on initial depression of said pedal, a drum coupled with said motor for rotation therewith, and an expansible spring seated around the inner wall of said drum having one end disconnectedly coupled with said pedal and the other disconnectedly coupled with said brake actuating shaft.

27. Vehicle brake mechanism comprising, in combination, brakes, a brake pedal, operating connections between the pedal and the brakes including a pair of arms co-axially supported for swinging movement adapted to be swung in the same direction in the application of the brakes, one arm coupled with the pedal and the other arm coupled with the brakes, said arms being relatively swingably displaced, and power means responsive to act upon the brakes upon the relative swingable displacement of said arms.

28. Vehicle brake mechanism comprising, in combination, brakes, operating connections for the brakes including two co-axially swingable arms relatively swingably displaceable, and power means automatically responsive to relative swingable displacement of said arms in a given direction to exert power effort upon the brakes.

29. Vehicle brake mechanism comprising, in combination, brakes, operating connections for the brakes including two co-axially swingable arms relatively swingably displaceable, and power means automatically responsive to the movement of one arm tending to overtake the other in its swinging to exert power effort upon the brakes.

30. Vehicle brake mechanism comprising, in combination, brakes, operating connections for the brakes including two co-axially swingable arms relatively swingably displaceable, and power means automatically responsive to the movement of one arm tending to overtake the other in its swinging to exert power effort upon the brakes and relatively releasable upon swingable separation of said arms.

In testimony whereof I, VINCENT G. APPLE, sign this specification.

VINCENT G. APPLE.